United States Patent [19]

Hatlen et al.

[11] Patent Number: 6,056,081

[45] Date of Patent: May 2, 2000

[54] MECHANICAL FRONT WHEEL DRIVE AXLE FOR IMPROVED STEERING

[75] Inventors: Richard P. Hatlen, Waterford, Wis.; Charles R. Busch; Michael J. Eifert, both of Ft. Wayne, Ind.

[73] Assignee: Case Corporation, Racine, Wis.

[21] Appl. No.: 08/951,404

[22] Filed: Oct. 16, 1997

[51] Int. Cl.$^7$ ................................................. B60K 17/00
[52] U.S. Cl. ........................... 180/346; 74/607; 280/91.1; 280/773
[58] Field of Search ................... 280/773, 91.1, 280/93.502, 93.512, 93.515, 110; 180/346; 74/607

[56] References Cited

U.S. PATENT DOCUMENTS

| | | |
|---|---|---|
| 1,195,267 | 8/1916 | Ravel . |
| 3,028,925 | 4/1962 | Baudhuin et al. . |
| 4,109,747 | 8/1978 | Hornagold et al. . |
| 4,184,560 | 1/1980 | Tischer . |
| 4,225,151 | 9/1980 | Taute et al. . |
| 4,449,600 | 5/1984 | Telfer . |
| 4,718,686 | 1/1988 | Dduba et al. . |
| 5,018,757 | 5/1991 | Kozuka . |
| 5,020,627 | 6/1991 | Wittke . |
| 5,282,644 | 2/1994 | Larson . |
| 5,460,236 | 10/1995 | Lewis et al. . |

FOREIGN PATENT DOCUMENTS

| | | | |
|---|---|---|---|
| 61-275064 | 12/1986 | Japan ....................................... | 280/91 |
| 1-226477 | 9/1989 | Japan ....................................... | 280/91 |
| 2154959 | 9/1985 | United Kingdom ..................... | 74/607 |

*Primary Examiner*—Eric Culbreth
*Attorney, Agent, or Firm*—Foley & Lardner

[57] ABSTRACT

A steerable drive axle for improved steering is provided. The steerable drive axle includes a drive shaft housing and at least one axle shaft. A portion of the axle shaft is rotatably supported by a bearing in the drive shaft housing. The drive shaft housing has an actuator recess disposed therein. The steerable drive axle further includes a wheel drive shaft supported by a wheel bearing assembly in a wheel bearing support. An angle drive assembly connects the axle shaft to the wheel drive shaft, and a pivot assembly pivotally attaches the drive shaft housing to the wheel bearing support. In addition, the steerable drive axle includes an actuator coupled between the drive shaft housing and the pivot assembly. A portion of the actuator is located within the actuator recess of the drive shaft housing when the pivot assembly is pivoted relative to the housing.

22 Claims, 5 Drawing Sheets

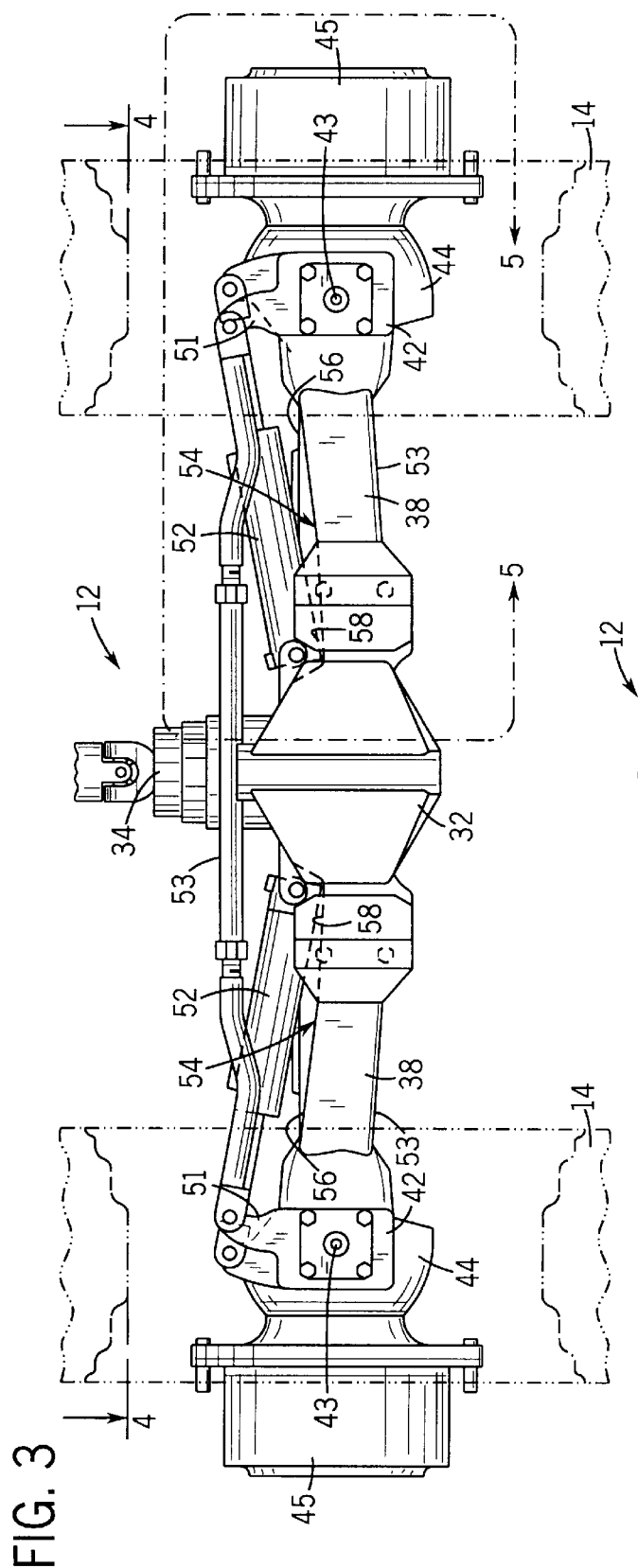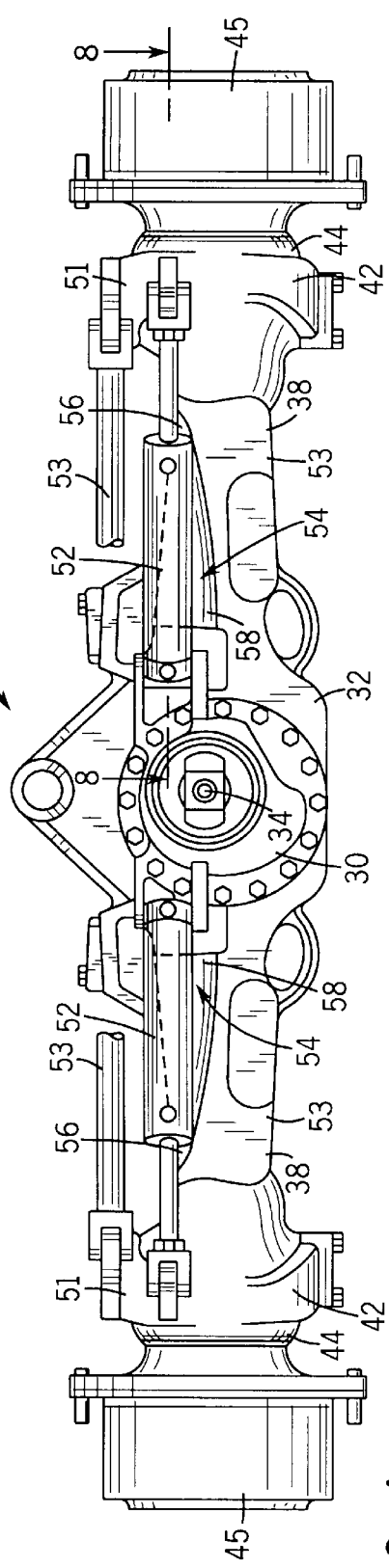
FIG. 3
FIG. 4

MECHANICAL FRONT WHEEL DRIVE AXLE FOR IMPROVED STEERING

FIELD OF THE INVENTION

The present invention relates generally to a work vehicle such as an agricultural tractor. More particularly, the invention relates to an improved mechanical front wheel drive axle for a vehicle.

BACKGROUND OF THE INVENTION

Front wheel driven work vehicles, such as agricultural tractors, often have a difficult time maneuvering among crops growing in narrow rows in a field. Maneuverability is restricted as a result of the axle construction and configurations required to apply power to the front wheels. Many of these work vehicles include mechanical front wheel drives which require larger sized tires. As a result of the larger tires and the construction of the tractors, these work vehicles are unable to negotiate smaller radius turns, because the angles at which the front wheels can be turned is limited.

There have been several attempts to improve the maneuverability of work vehicles with mechanical front wheel drives. One early attempt provides an agricultural tractor with a mechanical front wheel drive having large caster angle front wheels. The large caster angle enables a wheel to tuck under the tractor as the tractor turns. While this arrangement allows the tractor to negotiate smaller radius turns, sharper turns are still limited by interference of the steering cylinder with the axle housing.

In another attempt to increase maneuverability, a vehicle is provided in which both the axis of rotation of the drive shaft and the input shaft for the axle are aligned with the vehicle's oscillation centerline in order to increase the steering clearance of the vehicle. However, increasing the maximum steering angle is still hampered by interference of the wheel with the steering cylinder or the steering cylinder with the axle housing.

In view of the above-discussed problems, it would be desirable to increase the steering angles to permit the vehicle to negotiate tighter radius turns.

SUMMARY OF THE INVENTION

The present invention provides a drive axle which improves the steering angles of the vehicle. The invention features a drive shaft housing which encases an axle shaft. The drive shaft housing has a recess disposed therein. The recess enables an actuator to be positioned closer to the axle shaft, by placing a portion of the actuator within the recess.

In one embodiment, a steerable drive axle includes a bearing, a drive shaft housing and at least one axle shaft. A portion of the axle shaft is rotatably supported by the bearing in the drive shaft housing. The steerable drive axle further includes a wheel drive shaft, a wheel bearing support and a wheel bearing assembly. The wheel drive shaft is rotatably supported by the wheel bearing assembly in the wheel bearing support. An angle drive assembly connects the axle shaft to the wheel drive shaft. A pivot assembly pivotally attaches the drive shaft housing to the wheel bearing support, so that the angle between the drive and axle shafts can be varied by pivoting the pivot assembly relative to the drive shaft housing through a range of pivot angles. Finally, the steerable drive axle includes an actuator coupled between the drive shaft housing and the pivot assembly. A portion of the actuator is located within the recess of the drive shaft housing when the pivot assembly is pivoted relative to the housing at at least a portion of the range of the pivot angles.

In accordance with another embodiment, a drive shaft housing is provided for a steerable drive axle. The steerable drive axle includes a differential disposed in a differential housing. The differential has an input shaft and a drive shaft extending from the differential. A knuckle assembly connects the drive shaft to a wheel drive shaft. The steerable drive axle further includes a steering cylinder pivotally coupled to the knuckle assembly. The drive shaft housing of the steerable drive axle has a first end adapted to be mounted to the differential housing and a second end adapted to be mounted to the knuckle assembly. The drive shaft housing has a longitudinal hole disposed therein, extending from the first end to the second end, and adapted to receive the drive shaft. In addition, the drive shaft housing includes an outer wall disposed between the first and second ends. The outer wall has a recess which is configured to receive a portion of the steering cylinder when the steering cylinder is mounted to the drive shaft housing.

In accordance with a further embodiment, a four wheel drive work vehicle is provided. The vehicle includes an engine which drives a transmission. The engine is coupled to front and rear axles of the vehicle. Each axle includes an input shaft coupled at one end to the transmission and at the other end to a differential. A drive shaft extends from the differential of each axle. The drive shaft includes a knuckle assembly which rotatably supports a wheel of the vehicle. The drive shaft is located in a drive shaft housing which has an outer surface including a recess disposed therein. Each axle also includes a steering cylinder pivotally coupled to the knuckle assembly and the drive shaft housing. A portion of the steering cylinder is located in the recess of the drive shaft housing when the steering cylinder is coupled to the drive shaft housing.

BRIEF DESCRIPTION OF THE DRAWINGS

The present invention will become more fully understood from the following detailed description, taken in conjunction with the accompanying drawings, wherein like reference numerals refer to like parts, in which:

FIG. 3 is a top view of a mechanical front wheel drive axle of the tractor taken generally along line 3—3 of FIG. 1;

FIG. 4 is a rear view of the front axle taken generally along line 4—4 of FIG. 3;

DESCRIPTION OF THE PREFERRED EMBODIMENTS

Figure 1:
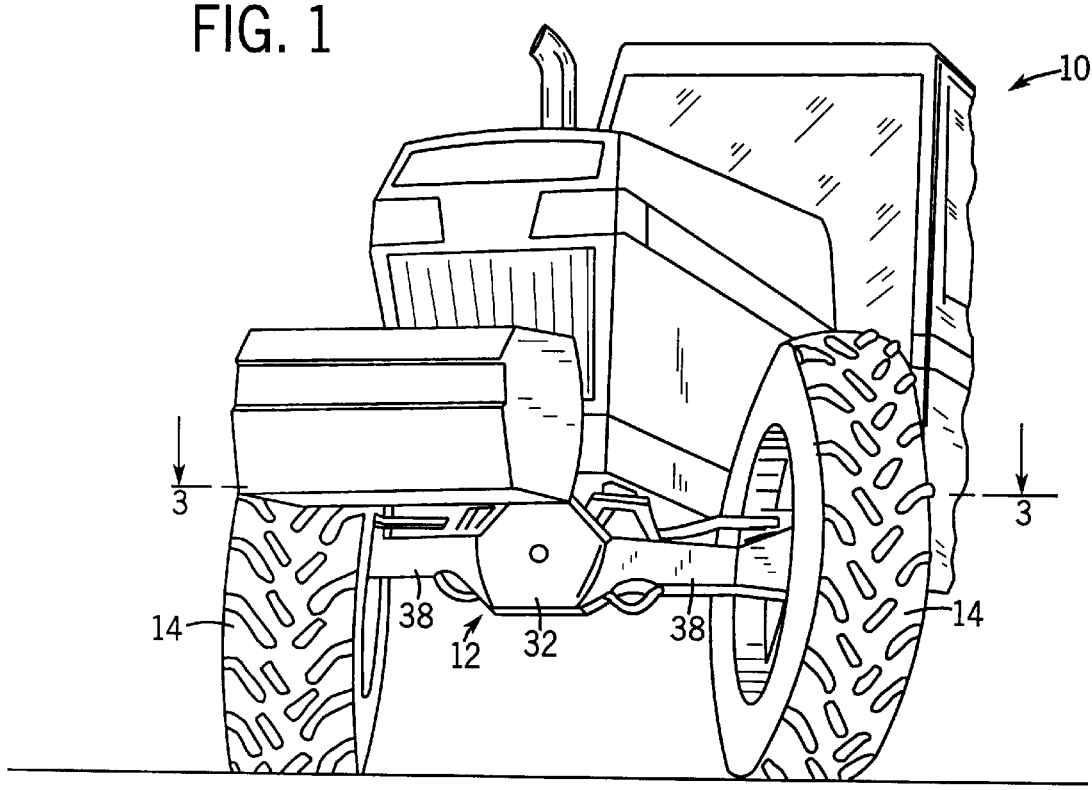
FIG. 1 is a schematic front perspective view of a farm tractor in accordance with the present invention.
Figure 2:
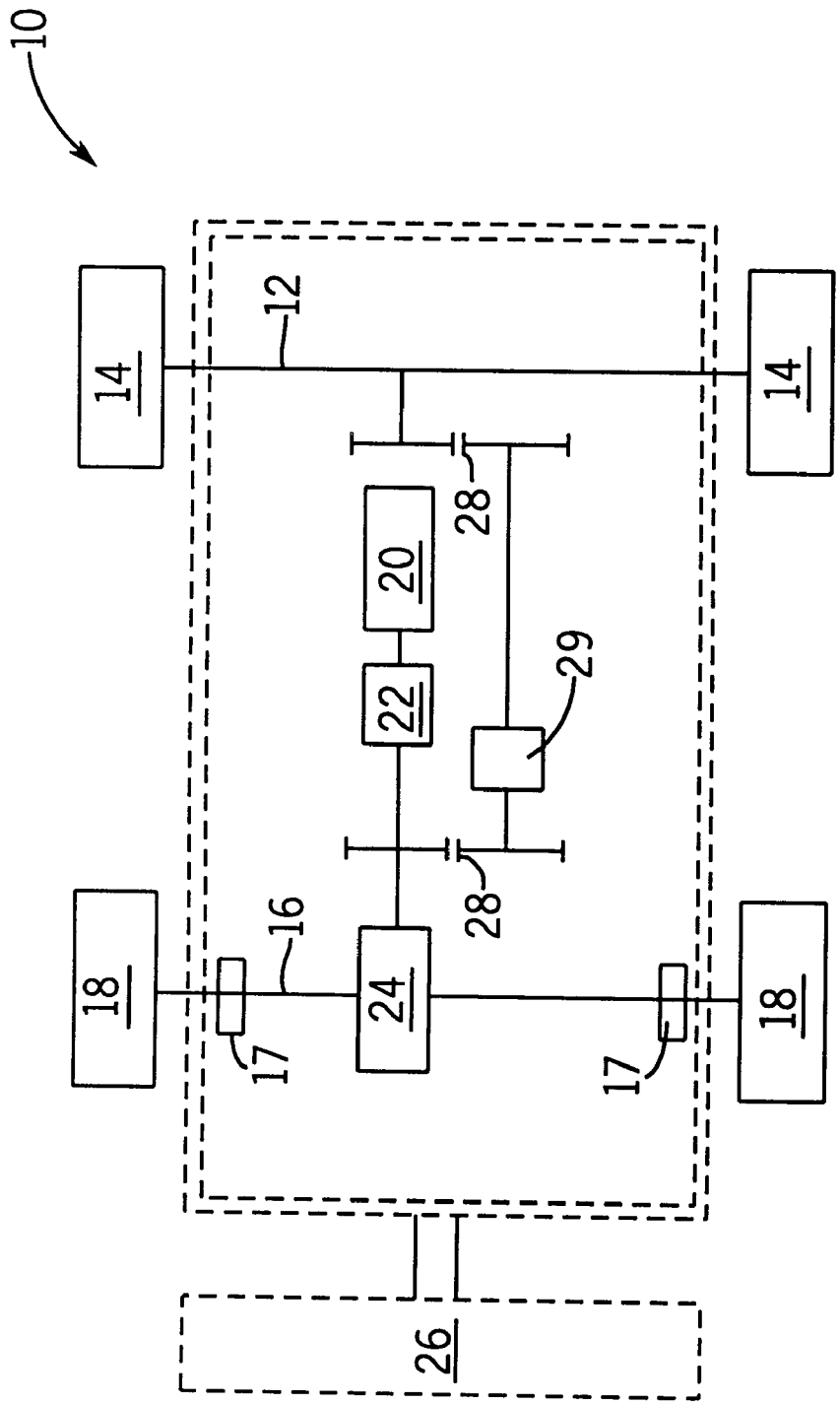
FIG. 2 is a diagrammatical representation of the tractor shown in FIG. 1.

Turning now to the drawings and referring generally to FIGS. 1 and 2, a work vehicle, such as an agricultural tractor, designated by the reference number 10 includes a front axle 12 coupled to front wheels 14 and a rear axle 16 coupled to rear wheels 18. A set of brakes 17 is provided on rear axle 16 for breakins rear wheels 18. An engine 20 provides power through a transmission 22 and a differential 24 to drive rear wheels 18. Differential 24 enables rear wheels 18 to turn at different speeds. In addition, power transmission elements (not shown) may also be coupled to engine 20 and transmission 22 for driving an implement 26, such as a ground-working implement, or performing auxiliary functions.

Front wheels 14 of vehicle 10 are steerable and may be selectively driven. When additional traction is needed, engine 20 may be selectively coupled to front wheels 14. Front wheels 14 are coupled to engine 20 through transmission 22 and a drive train including gearing 28.

Front wheels 14, shown in dashed lines in FIG. 3, are coupled to front axle 12. In a preferred embodiment of the invention, front axle 12 is a mechanical front wheel drive (MFD) axle having a MFD differential 30 (FIG. 4). The drive train which couples front wheels 14 to engine 20 also includes a MFD engagement assembly 29. MFD engagement assembly 29 may be of the type available on the 8900 series tractors manufactured by Case Corporation. MFD differential 30 which is similar to differential 24 permits front wheels 14 to rotate at different speeds. MFD differential 30 is encased in a differential housing 32 and has an input shaft 34. Input shaft 34 transmits power from engine 20 and transmission 22 to front wheels 14.

As shown in FIGS. 3–6 and 8, extending from the right and left sides of MFD differential 30 are drive shaft housings 38. For purposes of simplicity, the remainder of the description of front axle 12 will focus on the right side. The left side of front axle 12 includes the same components and is a mirror image of the right side. However, depending upon the application and the forces required to steer wheels 14, steering cylinders 52 may not be required on both sides. Thus, one side of housing 38 may not be configured to accommodate a steering cylinder or actuator.

A tie rod 53 extending along front axle 12 is pivotally connected to arms 51 projecting from pivot assemblies 42, located on to the right and left of MFD differential 30. Tie rod 53 maintains an angular relationship between wheels 14. Depending upon the manner in which the flow of fluid through steering cylinders 52 is controlled, fluid control schemes could be used to control the two actuators 52 precisely enough to negate the requirement of tie rods 53.

Figure 8:
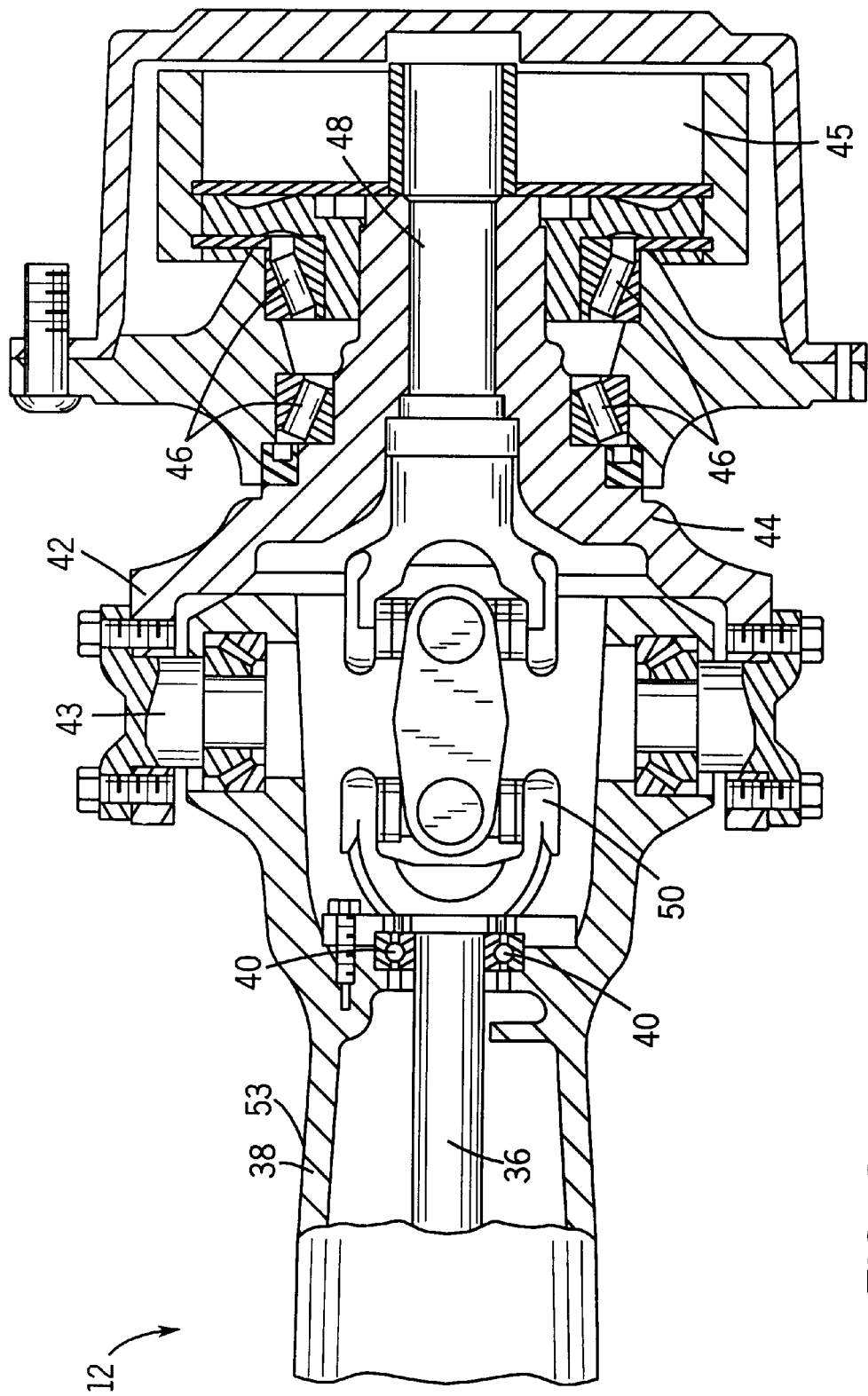
FIG. 8 is a cross-section view of the right side of the front axle shown in FIG. 3.

Drive shaft housing 38 encases an axle shaft 36 which extends from MFD differential 30. Axle shaft 36 is rotatably supported within drive shaft housing 38 by a bearing 40 (FIG. 8). Drive shaft housing 38 is coupled at one end to differential housing 32. The other end of drive shaft housing 38 is coupled to a pivot or knuckle assembly 42.

As shown in FIG. 8, pivot assembly 42 pivotally couples drive shaft housing 38 to a wheel bearing support 44. Wheel bearing support 44 contains a bearing assembly 46 which rotatably supports a wheel drive shaft 48. Wheel bearing support 44 is a conventional wheel support and includes a planetary gear drive assembly 45. A planetary gear set would be connected at the end of wheel drive shaft 48, but for purposes of simplicity is not shown. Pivot assembly 42 includes king pins 43 which pivotally couple support 44 to housing 38. Pins 43 enable wheel 14, coupled to wheel bearing support 44, to turn relative to drive shaft housing 38.

Pivot assembly 42 houses an angle drive assembly 50. Angle drive assembly 50 is coupled to axle shaft 36 at an end opposite from MFD differential 30. Angle drive assembly 50 is also coupled to wheel drive shaft 48 of bearing support 44. Angle drive assembly 50 may be a constant velocity joint. Alternatively, angle drive assembly 50 may be a universal joint.

Figure 7:
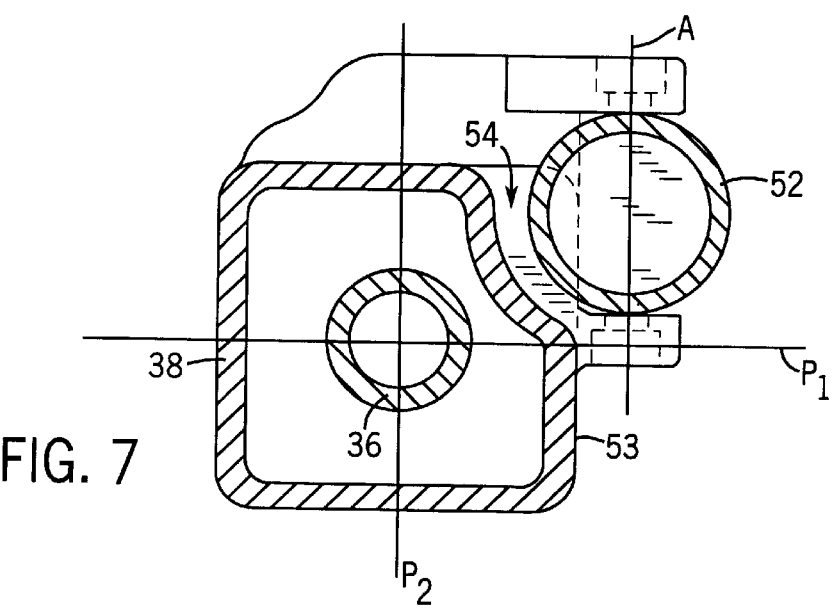
FIG. 7 is a cross-sectional view of the front axle taken generally along the line 7—7 of FIG. 5.

As shown in FIGS. 3, 4 and 7, drive shaft housing 38 which encases axle shaft 36 has an outer wall 53 with a recess 54 disposed therein. Recess 54, which is configured to receive a portion of an actuator 52, extends into drive shaft housing 38 but not far enough into housing 38 as to interfere with axle shaft 36. Recess 54 is preferably semi-conical in shape, with outer wall 53 having an impression similar to a truncated portion of a cone. A tip 56 of semi-conical recess 54 is located proximate pivot assembly 42, while a base 58 of recess 54 is located proximate MFD differential housing 32. Recess 54 extends further into housing 38 at base 58 than at tip 56.

Depending upon the application, the location of recess 54 in wall 53 may also be important. In particular, by offsetting recess 54 from plane $P_1$ (see FIG. 7) generally perpendicular with a pivot axis A of cylinder 52 and passing through the central axis of shaft 36, cylinder 52 can move closer to a plane $P_2$ parallel to axis A and the central axis of king pin 43. This improvement as shown in detail in FIGS. 4 and 7 can further increase pivot angles by permitting cylinders 52 to move closer to planes $P_2$.

Figure 5:
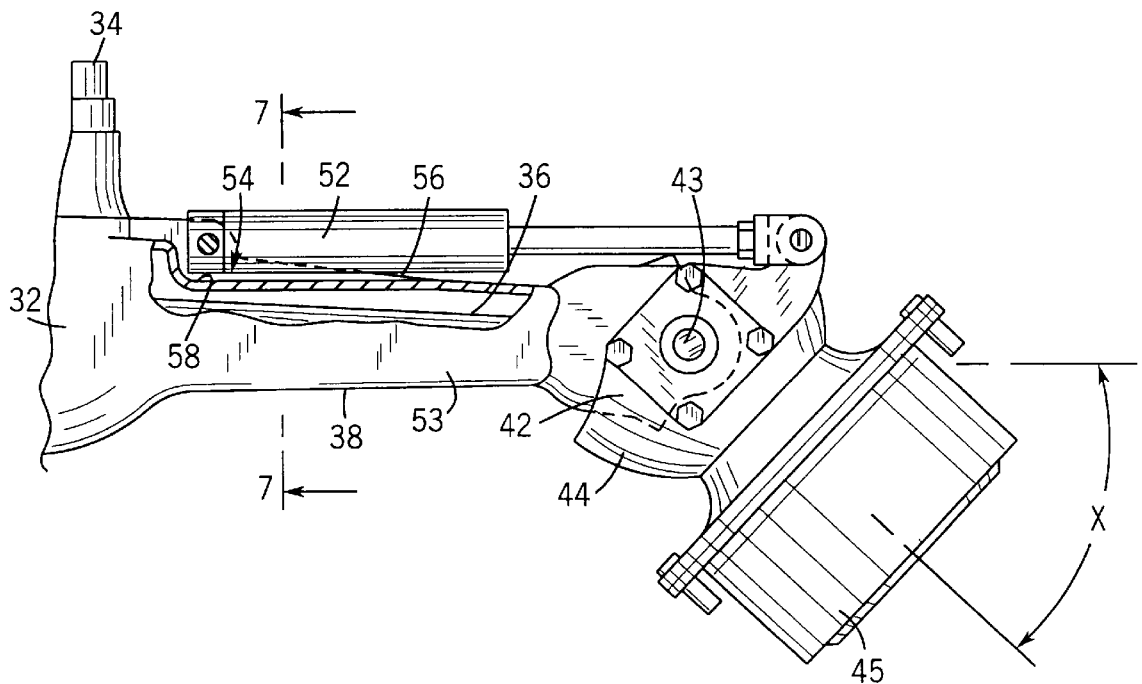
FIG. 5 is a top view of the right side of the front axle shown taken generally along line 5—5 of FIG. 3 and showing the wheel fully turned toward the right.
Figure 6:
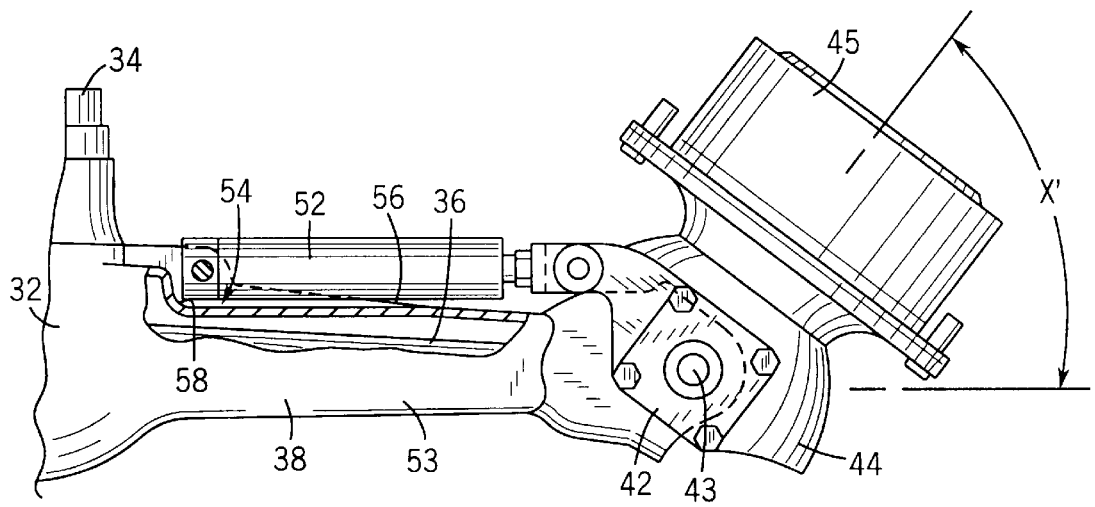
FIG. 6 is a top view of the right side of the front axle shown in FIG. 5 with the wheel fully turned toward the left.

Actuator 52 is disposed between and coupled to drive shaft housing 38 and a pivot arm 51 of pivot assembly 42. Actuator 52, which may be a hydraulic cylinder, turns pivot assembly 42 relative to drive shaft housing 38. At the turning angle which occurs as a result of the orientation of assembly 42 relative to housing 38 as shown in FIG. 6, a portion of actuator 52 is located in recess 54 of drive shaft housing 38 (FIG. 7), enabling actuator 52 to move closer to axle shaft 36 during steering. This configuration allows vehicle 10 to maneuver tighter radius turns before front wheels 14 interfere with actuator 52 and actuator 52 interferes with housing 38. Thus, as shown in FIGS. 5 and 6, front wheel 14 may pivot to the right and left at respective angles X to X'. For example, when the tread of front wheels 14 is set at 60 in., front axle 12 may steer such that angles X and X' are in excess of 46°.

It will be understood that the foregoing description is of a preferred embodiment of this invention and that the invention is not limited to the specific forms shown. For example, recess 54 of drive shaft housing 38 is not limited to a semi-conical shape. Recess may be cylindrical, parallelepipped or other configuration. This and other modifications may be made in the design and arrangement of other elements without departing from the scope of the invention as expressed in the appended claims.

What is claimed is:

1. A steetable drive axle comprising:
    a bearing;
    a drive shaft housing including a housing wall having an actuator recess located therein, the bearing being supported by the housing wall at an end of the housing;
    at least one axle shaft, wherein at least a portion of the shaft is located within the housing and the bearing rotatably supports the axle shaft within the housing;
    a wheel drive shaft;
    an angle drive assembly connected between the shafts,
    a wheel bearing assembly which rotatably supports the wheel drive shaft;
    a wheel bearing support within which the bearing assembly is supported;
    a pivot assembly attached to the end of the housing and the wheel bearing support to pivotally attach the bearing support to the end of the housing such that the angle between the wheel drive shaft and the axle shaft can be varied by pivoting the pivot assembly relative to the housing through a range of pivot angles; and an actuator coupled between the housing and the pivot assembly to pivot the pivot assembly relative to the housing, wherein at least a portion of the actuator is located within the actuator recess when the pivot assembly is pivoted relative to the housing at least a portion of the range of pivot angles;

wherein the actuator recess extends into a drive shaft housing cross-section perpendicular to the axle shaft.

2. The axle of claim 1, wherein the wherein the actuator recess has a cylindrical or parallelepiped configuration.

3. The axle of claim 1, wherein the pivot assembly pivots about a pivot axis; and the actuator recess is offset from a plane which is perpendicular to the pivot axis and passes trough a central axis of the axle drive shaft.

4. The axle of claim 1, wherein the actuator is a hydraulic cylinder.

5. The axle of claim 1, wherein the actuator recess is semi-conical.

6. The axle of claim 5, wherein the semi-conical recess has a tip and a base, the tip being disposed toward and the base being disposed away from the pivot assembly.

7. The axle assembly of claim 1, wherein the wheel bearing support includes a planetary gear set.

8. The axle of claim 1, wherein the wheel bearing support can pivot at least 46° from a straightforward position.

9. The axle of claim 1, further comprising:

a differential housing mounted to the drive shaft housing; and a differential disposed in the differential housing, the differential being coupled to the axle shaft at an end opposite the pivot assembly and including an input shaft.

10. The axle of claim 1, further comprising a king pin pivotally connected to the pivot assembly.

11. In a steerable drive axle including a differential disposed in a differential housing, an input shaft coupled to the differential, an axle drive shaft extending from the differential, a wheel drive shaft, a knuckle assembly connected between the shafts, and a steering cylinder pivotally coupled to the buckle assembly, a drive shaft housing comprising:

a first end adapted to be mounted to the differential housing;

a second end adapted to be mounted to the knuckle assembly, the second end having a longitudinal hole disposed therein, the longitudinal hole extending to the first end and being adapted to receive the axle drive shaft; and an outer wall disposed between the first and second ends, the outer wall including a recess disposed therein, the recess configured to receive a portion of the steering cylinder when the steering cylinder is mounted to the drive shaft housing;

wherein the recess extends into a drive shaft housing cross-section perpendicular to the axle drive shaft.

12. The drive shaft housing of claim 11, wherein the recess is semi-conical.

13. The drive shaft housing of claim 12, wherein the semi-conical recess has a tip and a base, the tip being disposed toward the second end, and the base being disposed toward the first end.

14. The axle of claim 11, wherein the knuckle assembly pivots about a pivot axis and the recess is offset from a plane which is perpendicular to the pivot axis and passes through a central axis of the axle drive shaft.

15. A four-wheel drive work vehicle comprising:

an engine;

a transmission driven by the engine; and front and rear axles coupled to the transmission, wherein the front axle includes:

a front input shaft coupled to the transmission;

a front differential connected to the front input shaft;

a front drive shaft extending from the front differential, the front drive shaft having a knuckle assembly adapted to rotatably support a front wheel of the work vehicle;

a front drive shaft housing encasing the front drive shaft and having an outer surface including a recess disposed therein; and a steering cylinder pivotally coupled to the knuckle assembly and the front drive shaft housing, wherein a portion of the steering cylinder is located in the recess of the front drive shaft housing when the steering cylinder is coupled to the front drive shaft housing;

wherein the recess extends into a front drive shaft housing cross-section perpendicular to the front drive shaft.

16. The work vehicle of claim 15, wherein the recess of the from drive shaft housing is semi-conical.

17. The work vehicle of claim 16, wherein the semi-conical recess has a tip and a base, the tip being disposed toward and the base being disposed away from the knuckle assembly.

18. The work vehicle of claim 15, wherein the front axle further includes a wheel bearing support coupled to the knuckle assembly and guided by the steering cylinder.

19. The work vehicle of claim 18, wherein the wheel bearing support may pivot at least 46° from a straightforward position.

20. The work vehicle of claim 15, wherein the knuckle assembly includes a king pin.

21. The work vehicle of claim 15, wherein the rear axle includes:

a rear input shaft coupled to the transmission;

a second differential connected to the rear input shaft;

a rear drive shaft extending from the second differential, the rear drive shaft having a second knuckle assembly adapted to rotatably support a rear wheel of the work vehicle;

a rear drive shaft housing encasing the rear drive shaft and having an outer surface including a recess disposed therein; and a second steering cylinder pivotally coupled to the second knuckle assembly and the rear drive shaft housing, wherein a portion of the second steering cylinder is located in the recess of the rear drive shaft housing when the second steering cylinder is coupled to the rear drive shaft housing.

22. The work vehicle of claim 21, wherein the wherein the recess in the rear drive shaft housing is semi-conical.

* * * * *